US012142765B2

(12) United States Patent
Tajima et al.

(10) Patent No.: US 12,142,765 B2
(45) Date of Patent: Nov. 12, 2024

(54) ALL-SOLID-STATE BATTERY AND MANUFACTURING METHOD THEREOF

(71) Applicant: SEMICONDUCTOR ENERGY LABORATORY CO., LTD., Atsugi (JP)

(72) Inventors: Ryota Tajima, Kanagawa (JP); Yumiko Yoneda, Kanagawa (JP); Yohei Momma, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 629 days.

(21) Appl. No.: 17/424,296

(22) PCT Filed: Jan. 14, 2020

(86) PCT No.: PCT/IB2020/050243
§ 371 (c)(1),
(2) Date: Jul. 20, 2021

(87) PCT Pub. No.: WO2020/152540
PCT Pub. Date: Jul. 30, 2020

(65) Prior Publication Data
US 2022/0115661 A1  Apr. 14, 2022

(30) Foreign Application Priority Data
Jan. 25, 2019 (JP) .................. 2019-010953

(51) Int. Cl.
*H01M 4/38* (2006.01)
*H01M 4/02* (2006.01)
(Continued)

(52) U.S. Cl.
CPC ........... *H01M 4/583* (2013.01); *H01M 4/386* (2013.01); *H01M 4/625* (2013.01);
(Continued)

(58) Field of Classification Search
CPC ......... H01M 10/0562; H01M 10/0525; H01M 4/583; H01M 4/386; H01M 2004/027; H01M 2004/028
See application file for complete search history.

(56) References Cited

U.S. PATENT DOCUMENTS 8,404,001 B2  3/2013 Kuriki
9,109,286 B2  8/2015 Yamazaki et al.
(Continued)

FOREIGN PATENT DOCUMENTS

CN  105393396 A  3/2016
CN  110114910 A  8/2019
(Continued)

OTHER PUBLICATIONS

Machine Translation of WO-2014020654-A1 (Feb. 27, 2024) (Year: 2024).*
(Continued)

*Primary Examiner* — Matthew J Merkling
(74) *Attorney, Agent, or Firm* — Fish & Richardson P.C.

(57) ABSTRACT

Use of silicon as a negative electrode active material particle causes a problem of expansion and contraction of the negative electrode active material particle due to charging and discharging. A negative electrode active material particle or a plurality of negative electrode active material particles are bound or fixed using a graphene compound to inhibit expansion and contraction of the negative electrode active material particle due to charging and discharging. In an all-solid-state secondary battery, an interface between a solid electrolyte and a negative electrode or an interface between the solid electrolyte and a positive electrode has the highest resistance. In order to reduce the interface resistance, at least the negative electrode active material particle is surrounded by a graphene compound to increase the conductivity. Alternatively, a positive electrode active material
(Continued)

particle is surrounded by a graphene compound to increase the conductivity. Carrier ions, e.g., lithium ions, pass through a graphene compound, and thus the graphene compound does not hinder the transfer of lithium ions between the positive electrode and the negative electrode in charging or discharging.

19 Claims, 11 Drawing Sheets

(51) Int. Cl.
  *H01M 4/583* (2010.01)
  *H01M 4/62* (2006.01)
  *H01M 10/0525* (2010.01)
  *H01M 10/0562* (2010.01)
(52) U.S. Cl.
  CPC ... *H01M 10/0525* (2013.01); *H01M 10/0562* (2013.01); *H01M 2004/027* (2013.01); *H01M 2004/028* (2013.01)

(56) References Cited

U.S. PATENT DOCUMENTS

| | | | |
|---|---|---|---|
| 9,646,771 | B2 | 5/2017 | Kuriki et al. |
| 10,243,214 | B2 | 3/2019 | Todoriki et al. |
| 10,734,639 | B2 | 8/2020 | Aria et al. |
| 11,081,691 | B2 | 8/2021 | Aria et al. |
| 2011/0308935 | A1 | 12/2011 | Yamazaki et al. |
| 2012/0058397 | A1 | 3/2012 | Zhamu et al. |
| 2012/0064409 | A1 | 3/2012 | Zhamu et al. |
| 2012/0260478 | A1 | 10/2012 | Kuriki |
| 2012/0308891 | A1 | 12/2012 | Todoriki et al. |
| 2012/0328956 | A1* | 12/2012 | Oguni ................ B82Y 40/00 428/221 |
| 2013/0059209 | A1* | 3/2013 | Ota .................... H01M 4/5815 29/874 |
| 2013/0084496 | A1* | 4/2013 | Osada ................ H01M 4/625 977/734 |
| 2013/0249054 | A1 | 9/2013 | Kuriki et al. |
| 2015/0010788 | A1 | 1/2015 | Aria et al. |
| 2021/0104744 | A1 | 4/2021 | Oguni et al. |

FOREIGN PATENT DOCUMENTS

| | | | |
|---|---|---|---|
| DE | 112017006205 | | 8/2019 |
| EP | 3017494 | A | 5/2016 |
| JP | 2012-023032 | A | 2/2012 |
| JP | 2012-230889 | A | 11/2012 |
| JP | 2013-028526 | A | 2/2013 |
| JP | 2013-229308 | A | 11/2013 |
| JP | 2013-229315 | A | 11/2013 |
| JP | 2016-528678 | | 9/2016 |
| JP | 2018-098200 | A | 6/2018 |
| KR | 2016-0026978 | A | 3/2016 |
| KR | 2019-0088064 | A | 7/2019 |
| WO | WO-2014020654 A1 * | | 2/2014 .......... H01M 10/052 |
| WO | WO-2015/003038 | | 1/2015 |
| WO | WO-2018/104838 | | 6/2018 |

OTHER PUBLICATIONS

International Search Report (Application No. PCT/IB2020/050243) dated Apr. 7, 2020.

Written Opinion (Application No. PCT/IB2020/050243) dated Apr. 7, 2020.

* cited by examiner

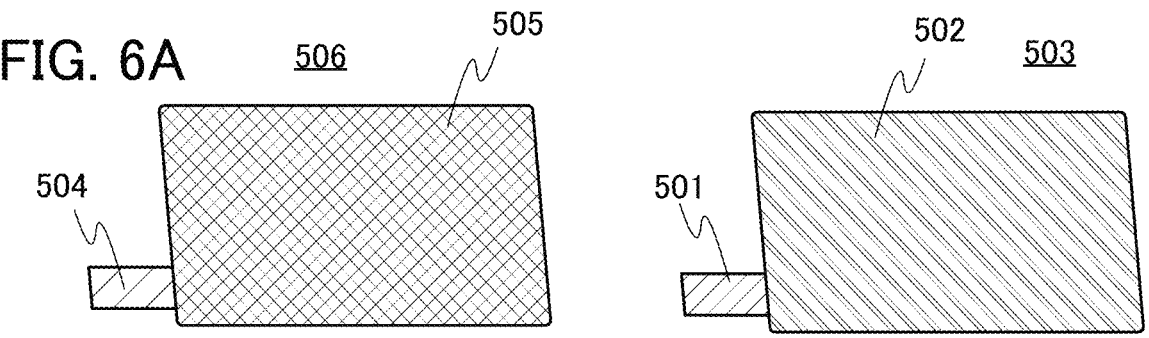
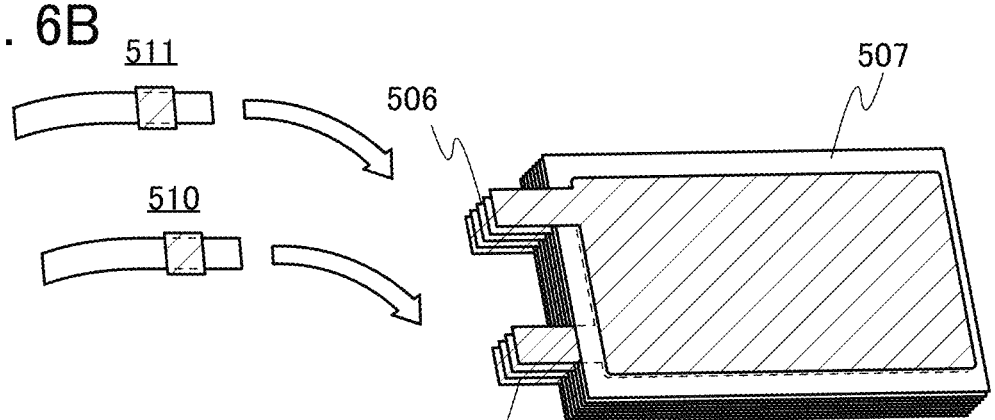
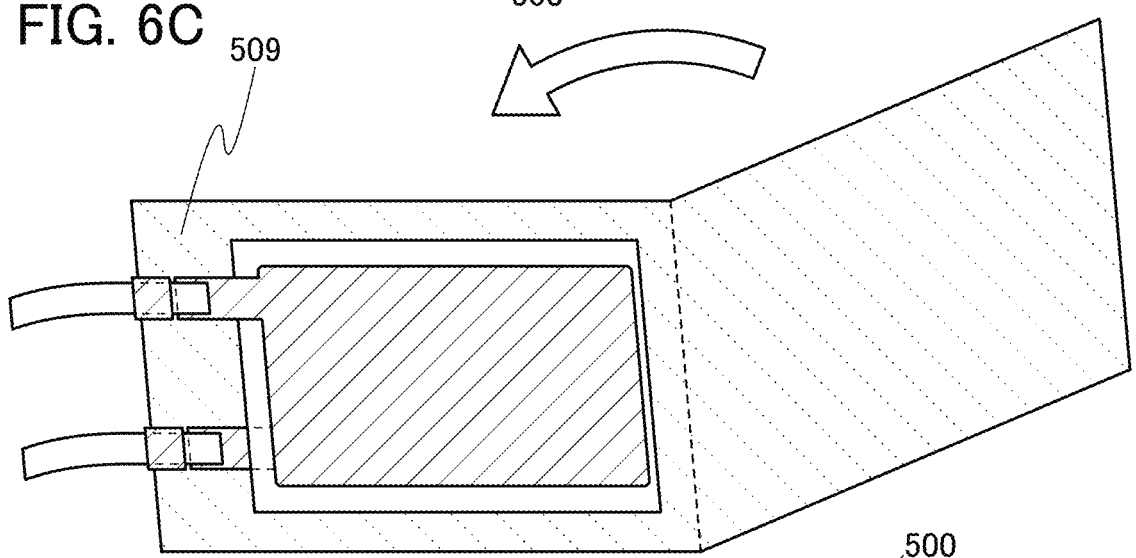
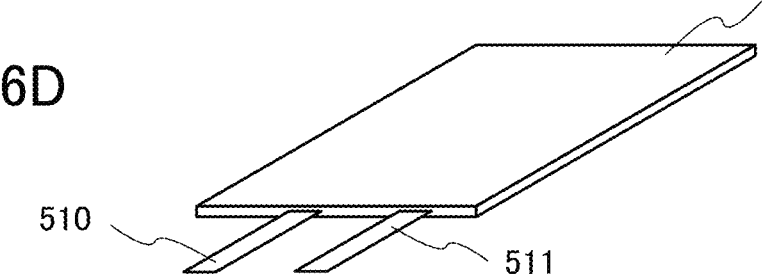

ALL-SOLID-STATE BATTERY AND MANUFACTURING METHOD THEREOF

CROSS REFERENCE TO RELATED APPLICATIONS

This application is a U.S. National Phase Application under 35 U.S.C. § 371 of International Application PCT/IB2020/050243, filed on Jan. 14, 2020, which is incorporated by reference and claims the benefit of a foreign priority application filed in Japan on Jan. 25, 2019, as Application No. 2019-010953.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification generally mean devices including power storage devices, and electrooptical devices including power storage devices, information terminal devices including power storage devices, and the like are all electronic devices.

BACKGROUND ART

Electronic devices carried around by users and electronic devices worn by users have been actively developed.

Electronic devices carried around by users and electronic devices worn by users operate using primary batteries or secondary batteries, which are examples of a power storage device, as power sources. It is desired that electronic devices carried around by users be used for a long time; thus, a high-capacity secondary battery is used. Since high-capacity secondary batteries are large in size, there is a problem in that their incorporation in electronic devices increases the weight of the electronic devices. In view of the problem, development of small or thin high-capacity secondary batteries that can be incorporated in portable electronic devices are is being pursued.

A lithium ion secondary battery using liquid such as an organic solvent as a transmission medium of lithium ions serving as carrier ions is widely used. However, a secondary battery using liquid has problems such as the operable temperature range, decomposition reaction of an electrolyte solution by a potential to be used, and liquid leakage to the outside of the secondary battery since the secondary battery uses liquid. In addition, a secondary battery using liquid as an electrolyte has a risk of ignition due to liquid leakage.

A fuel battery is a secondary battery using no liquid; however, noble metals are used for the electrodes, and a material of a solid electrolyte is also expensive.

In addition, as a secondary battery using no liquid, a power storage device using a solid electrolyte, which is called a solid battery, is known. For example, Patent Document 1, Patent Document 2, and the like are disclosed. Patent Document 3 discloses a lithium ion secondary battery using any one of a solvent, gel, and a solid electrolyte as an electrolyte.

Patent Document 4 discloses an example of using graphene oxide for a positive electrode active material layer of a solid-state battery.

Furthermore, Patent Document 5 and the like disclose a solid-state battery using graphene.

REFERENCE

Patent Document

[Patent Document 1] Japanese Published Patent Application No. 2012-230889
[Patent Document 2] Japanese Published Patent Application No. 2012-023032
[Patent Document 3] Japanese Published Patent Application No. 2013-229308
[Patent Document 4] Japanese Published Patent Application No. 2013-229315
[Patent Document 5] Japanese Published Patent Application No. 2018-98200

SUMMARY OF THE INVENTION

Problems to be Solved by the Invention

An all-solid-state secondary battery having higher level of safety than a conventional lithium-ion secondary battery is provided.

In the case of an all-solid-state secondary battery, problems of a secondary battery using an electrolyte solution, such as leakage of an electrolyte solution and deterioration of an electrolyte solution due to a change in the quality, are solved; however, other problems remain.

Furthermore, use of silicon as a negative electrode active material particle of an all-solid-state secondary battery causes a problem of expansion and contraction of the negative electrode active material particle due to charging and discharging.

Moreover, it is found that there is a problem in that a minute short circuit (hereinafter referred to as a micro short circuit) is caused even in an all-solid-state secondary battery. Accordingly, inhibiting a short circuit or a micro short circuit from occurring between a positive electrode and a negative electrode in an all-solid-state secondary battery is also one of the problems.

Means for Solving the Problems

In order to solve the above problems, a negative electrode active material particle or a plurality of negative electrode active material particles are bound or fixed using a graphene compound to inhibit expansion and contraction of the negative electrode active material particle due to charging and discharging.

In an all-solid-state secondary battery, an interface between a solid electrolyte and a negative electrode or an interface between the solid electrolyte and a positive electrode has the highest resistance. In order to reduce the interface resistance, at least the negative electrode active material particle is surrounded by a graphene compound to increase the conductivity. Alternatively, a positive electrode active material particle is surrounded by a graphene compound to increase the conductivity. Carrier ions, e.g., lithium ions, pass through a graphene compound, and thus the graphene compound does not hinder the transfer of lithium ions between the positive electrode and the negative electrode in charging or discharging.

In addition, a negative electrode active material particle or a plurality of negative electrode active material particles are bound or fixed using a graphene compound, whereby generation of a by-product (a precipitate or the like) can be impaired, and generation of a micro short circuit can be inhibited.

Note that a micro short circuit refers to a minute short circuit in a secondary battery, and is not a short circuit of a positive electrode and a negative electrode of a secondary battery which makes charging and discharging impossible but a phenomenon in which a small amount of short circuit current flows through a minute short circuit portion for a period longer than or equal to 10 nanoseconds and shorter than 1 microsecond. A micro short circuit is caused in the following manner: when a plurality of charging and discharging operations are performed, an uneven distribution of positive electrode active material particles leads to local concentration of current in part of the positive electrode and part of the negative electrode, and the function of a separator partially stops or a by-product (a precipitate or the like) is generated.

Moreover, repetition of micro short circuits may cause abnormal heating in a secondary battery, and may lead to serious accidents such as a fire.

In view of this, for prevention of a local current concentration in part of a negative electrode and part of a positive electrode, a surface or an inner portion of the negative electrode is surrounded and fixed by a graphene compound to increase the conductivity.

One of structures disclosed in this specification is an all-solid-state battery including at least positive electrode active material particles containing carrier ions, a plurality of negative electrode active material particles, a plurality of solid electrolyte particles, and graphene compounds, in which the graphene compounds fix the negative electrode active material particles, and the carrier ions pass through the graphene to be taken into the negative electrode active material particles in charging.

Another structure of the invention is an all-solid-state battery including a plurality of positive electrode active material particles containing carrier ions, a plurality of negative electrode active material particles, a plurality of solid electrolyte particles, and a plurality of graphene compounds, in which one or more of the negative electrode active material particles are fixed by one or more of the graphene compounds.

Note that graphene in this specification has a carbon hexagonal lattice structure and includes single-layer graphene or multilayer graphene including two to one hundred layers. Single-layer graphene (one graphene) refers to a one-atom-thick sheet of carbon molecules having $sp^2$ bonds. A plurality of graphene refers to multilayer graphene or a plurality of single-layer graphene. Graphene is not limited to being formed of only carbon, may be partly bonded to oxygen, hydrogen, or a functional group, and can also be referred to as a graphene compound. A graphene compound contains a graphene quantum dot. A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. The graphene compound may be formed as a coating film to cover the entire surface of the active material using a spray dry apparatus. Here, it is particularly preferable to use, for example, graphene, multilayer graphene, a graphene quantum dot, or RGO as a graphene compound. Note that RGO refers to a compound obtained by reducing graphene oxide (GO), for example.

Another structure of the invention is an all-solid-state battery including a plurality of positive electrode active material particles containing carrier ions, a plurality of negative electrode active material particles, a plurality of solid electrolyte particles, and a plurality of graphene compounds, in which one or more of the positive electrode active material particles are fixed by one or more of the graphene compounds.

In the above structure, an oxide containing lithium and cobalt is preferably used as the positive electrode active material particle. The positive electrode active material particle further preferably has a crystal structure expressed by a space group R-3m, for example. The positive electrode active material particle preferably has a pseudo-spinel structure that is described later, particularly when the depth of charge is large.

In addition, the concentration of halogen such as fluorine in a surface portion of the positive electrode active material particle is preferably higher than the average concentration in one entire particle. When halogen exists in the surface portion that is a region in contact with an electrolyte solution, the corrosion resistance to hydrofluoric acid can be effectively improved.

In this manner, the surface portion of the positive electrode active material particle preferably has a higher concentration of fluorine than the inner portion and a composition different from that in the inner portion. In addition, the composition preferably has a crystal structure stable at normal temperature. Thus, the surface portion may have a crystal structure different from that of the inner portion. For example, at least part of the surface portion of the positive electrode active material particle may have a rock-salt crystal structure. Furthermore, in the case where the surface portion and the inner portion have different crystal structures, the orientations of crystals in the surface portion and the inner portion are preferably substantially aligned.

Thus, the surface portion of the positive electrode active material particle should contain at least an element M, and further contain an element A in the discharged state to have a path through which the element A is inserted and extracted. Note that the element A is a metal serving as a carrier ion. As the element A, an alkaline metal such as lithium, sodium, or potassium or a Group 2 element such as calcium, beryllium, or magnesium can be used, for example. In the case where sodium is selected, carrier ions are sodium ions.

The element M is a transition metal, for example. As the transition metal, at least one of cobalt, manganese, and nickel can be used, for example. The positive electrode material of one embodiment of the present invention preferably contains one or more of cobalt, nickel, and manganese, particularly cobalt, as the element M, for example. The positive electrode material may contain, at an element M position, an element with no valence change that can have the same valence as the element M, such as aluminum, specifically a trivalent representative element, for example.

Another structure is an all-solid-state battery in which both of the positive electrode active material particle and the negative electrode active material particle are surrounded by respective graphene compounds, in which both a plurality of positive electrode active material particles containing carrier ions and a plurality of first solid electrolyte particles are at least partly or entirely surrounded by a first graphene compound, both a plurality of negative electrode active material particles and a plurality of second solid electrolyte particles are at least partly or entirely surrounded by a second graphene compound, and third solid electrolyte particles are included between the first graphene compound and the second graphene compound overlapping with the first graphene compound.

Another structure of the invention is an all-solid-state battery where a plurality of groups in each of which a plurality of positive electrode active material particles containing carrier ions and a plurality of first solid electrolyte particles are surrounded by a first graphene compound are adjacent to each other; a plurality of negative electrode active material particles and a plurality of second solid electrolyte particles are surrounded by a second graphene compound; and third solid electrolyte particles are included between the groups of the first graphene compound and the second graphene compound overlapping with the groups of the first graphene compound.

In each of the above structures, the first, second, and third solid electrolyte particles contain the same component. In the case where materials containing the same component are used, the manufacturing cost can be reduced because the same material is used. The first, second, and third solid electrolyte particles may be formed using different materials. In the case of using different materials, a material compatible with a positive electrode active material particle to be used is used as the first solid electrolyte particle, and a material compatible with a negative electrode active material particle to be used is used as the second solid electrolyte particle. "Being compatible" means that an undesirable by-product or the like is not generated by contact in charging and discharging.

With each of the above structures, a by-product (a precipitate or the like) can be prevented from being generated in the negative electrode, and generation of a micro short circuit can be inhibited.

In the all-solid-state battery, an inflammable organic solvent is not used, leading to simplification of a safety device, so that the all-solid-state battery excels in the manufacturing cost and the productivity.

Graphene oxide is subjected to reduction treatment or the like, whereby graphene or a graphene compound is formed.

Graphene oxide includes an epoxy group, a carbonyl group, a carboxyl group, a hydroxyl group, or the like. In a solution having polarity, different graphene oxides are not easily aggregated because oxygen in a functional group is negatively charged. Thus, the graphene oxide is easily dispersed uniformly in the solution having polarity.

In each of the above structures, a sulfide-based solid electrolyte and an oxide-based solid electrolyte can be used for the solid electrolyte particle.

Examples of the sulfide-based solid electrolyte include lithium composite sulfide materials such as $Li_2S$—$SiS_2$—$Li_3PO_4$, $Li_2S$—$P_2S_5$, $Li_2S$—$SiS_2$—$Ga_2S_3$, $LiI$—$Li_2S$—$P_2S_5$, $LiI$—$Li_2S$—$B_2S_3$, $LiI$—$Li_2S$—$SiS_2$, $Li_3PO_4$—$Li_2S$—$SiS_2$, and $Li_4SiO_4$—$Li_2S$—$SiS_2$.

Examples of the oxide-based solid electrolyte are lithium composite oxides and lithium oxide materials such as LiPON, $Li_2O$, $Li_2CO_3$, $Li_2MoO_4$, $Li_3PO_4$, $Li_3VO_4$, $Li_4SiO_4$, LLT($La_{2/3-x}Li_{3x}TiO_3$), and LLZ($Li_7La_3Zr_2O_{12}$).

LLZ is a garnet oxide containing Li, La, and Zr and may be a compound containing Al, Ga, or Ta.

Alternatively, a polymer solid electrolyte such as PEO (polyethylene oxide) formed by a coating method or the like may be used. Still alternatively, a composite solid electrolyte containing any of the above inorganic solid electrolytes and a polymer-based solid electrolyte may be used.

In this specification and the like, a surface portion of a particle of an active material or the like refers to a region from a surface to a depth of approximately 10 nm. A plane generated by a crack may also be referred to as a surface. In addition, a region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In addition, in this specification and the like, a rock-salt crystal structure refers to a structure in which cations and anions are alternately arranged. Note that a cation or anion vacancy may exist.

In addition, in this specification and the like, a pseudo-spinel crystal structure of a composite oxide containing lithium and a transition metal refers to a space group R-3m, which is not a spinel crystal structure but a crystal structure in which oxygen is hexacoordinated to ions such as cobalt and magnesium, and the cation arrangement has symmetry similar to that of the spinel crystal structure. Note that in the pseudo-spinel crystal structure, oxygen is tetracoordinated to a light element such as lithium in some cases. Also in that case, the ion arrangement has symmetry similar to that of the spinel crystal structure.

The pseudo-spinel crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material particle containing a large amount of cobalt is known not to have this crystal structure generally.

Anions of a layered rock-salt crystal and anions of a rock-salt crystal have cubic closest packed structures (face-centered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

Whether the crystal orientations in two regions are substantially aligned can be judged from a TEM (transmission electron microscope) image, a STEM (scanning transmission electron microscope) image, a HAADF-STEM (high-angle annular dark field scanning transmission electron microscope) image, an ABF-STEM (annular bright-field scanning transmission electron microscope) image, and the like. X-ray diffraction (XRD), electron diffraction, neutron diffraction, and the like can also be used for judging. In the TEM image and the like, alignment of cations and anions can be observed as repetition of bright lines and dark lines. When the orientations of cubic closest packed structures in the layered rock-salt crystal and the rock-salt crystal are aligned, a state where an angle made by the repetition of bright lines and dark lines in the layered rock-salt crystal and the rock-salt crystal is less than or equal to 5°, further preferably less than or equal to 2.5° can be observed. Note that in the TEM image and the like, a light element typified by oxygen or fluorine cannot be clearly observed in some cases; however, in such a case, alignment of orientations can be judged by arrangement of metal elements.

In addition, in this specification and the like, theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In addition, in this specification and the like, charge depth obtained when all lithium that can be inserted and extracted is inserted is 0, and charge depth obtained when all lithium that can be inserted and extracted and is contained in a positive electrode active material is extracted is 1.

In addition, in this specification and the like, charging refers to transfer of lithium ions from a positive electrode to a negative electrode in a battery and transfer of electrons from a negative electrode to a positive electrode in an external circuit. For a positive electrode active material, extraction of lithium ions is called charging. A positive electrode active material with a charge depth of greater than or equal to 0.7 and less than or equal to 0.9 may be referred to as a positive electrode active material charged with a high voltage.

Similarly, discharging refers to transfer of lithium ions from a negative electrode to a positive electrode in a battery and transfer of electrons from a positive electrode to a negative electrode in an external circuit. For a positive electrode active material, insertion of lithium ions is called discharging. Furthermore, a positive electrode active material with a charge depth of less than or equal to 0.06 or a positive electrode active material from which more than or equal to 90% of the charge capacity is discharged from a state where the positive electrode active material is charged with high voltage is referred to as a sufficiently discharged positive electrode active material.

Effect of the Invention

A negative electrode active material particle or a positive electrode active material particle is fixed to be surrounded by a graphene compound, whereby stress due to expansion and contraction of the negative electrode active material particle or the positive electrode active material particle can be relieved. Accordingly, deterioration of characteristics due to expansion and contraction of the negative electrode active material particle or the positive electrode active material particle in charging or discharging can be prevented.

BRIEF DESCRIPTION OF THE DRAWINGS

FIG. 6A, FIG. 6B, FIG. 6C, and FIG. 6D are perspective views of an all-solid-state battery.

MODE FOR CARRYING OUT THE INVENTION

Embodiments of the present invention are described in detail with reference to the drawings. Note that the present invention is not limited to the following description, and it is readily understood by those skilled in the art that modes and details of the present invention can be modified in various ways. In addition, the present invention should not be construed as being limited to the description of embodiments below.

Embodiment 1

In this embodiment, an example of manufacture of an all-solid-state secondary battery in which reduced graphene oxide is attached and fixed to a positive electrode, an oxide solid electrolyte, a negative electrode, and a surface of the negative electrode, expansion and contraction due to charging and discharging are inhibited, and the ion conductivity is improved is described.

Figure 1:
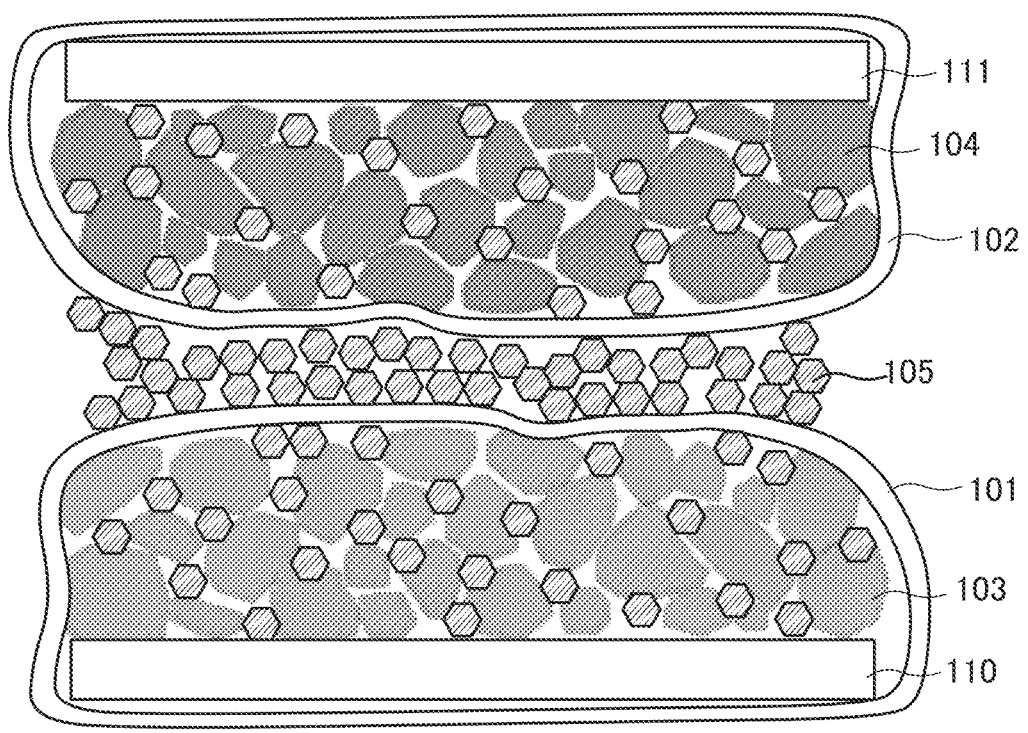
FIG. 1 is an example of a schematic cross-sectional view of a secondary battery showing one embodiment of the present invention.

FIG. 1 is a diagram showing a concept of a cross-sectional structure of a solid-state battery.

A plurality of solid electrolyte particles 105 are included between a positive electrode current collector 111 and a negative electrode current collector 110. The positive electrode current collector and the negative electrode current collector can be formed using a known metal material that can be used for an all-solid-state battery, and contain one or more kinds selected from Cu, Ni, Al, V, Au, Pt, Mg, Fe, Ti, Cr, Zn, Ge, and In.

The solid-state battery includes a thin-film-type all-solid-state battery and a bulk-type all-solid-state battery. The thin-film-type all-solid-state battery is obtained by stacking thin films, and the bulk-type all-solid-state battery is obtained by depositing microscopic particles. FIG. 1 shows an example of a bulk-type all-solid-state battery.

As shown in FIG. 1, positive electrode active material particles 104 are included in the vicinity of the positive electrode current collector 111, negative electrode active material particles 103 are included in the vicinity of the negative electrode current collector 110, and the solid electrolyte particles 105 are placed to fill gaps therebetween.

For the negative electrode active material particle, an element that enables charge-discharge reaction by alloying and dealloying reactions with lithium can be used. For example, a material containing at least one of silicon, tin, gallium, aluminum, germanium, lead, antimony, bismuth, silver, zinc, cadmium, indium, and the like can be used. Such elements have higher capacity than carbon, and silicon in particular has a high theoretical capacity of 4200 mAh/g. For this reason, silicon is preferably used as the negative electrode active material particle. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium and a compound containing the element, for example, may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably 0.2 or more and 1.5 or less, further preferably 0.3 or more and 1.2 or less.

Alternatively, for the negative electrode active material particle, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Furthermore, a first graphene compound 101 is provided to surround the negative electrode current collector 110 and the plurality of negative electrode active material particles 103.

The negative electrode active material particle or the plurality of negative electrode active material particles are fixed to the negative electrode current collector 110 using the first graphene compound 101. In addition, the negative electrode active material particle or the plurality of negative electrode active material particles are bound or fixed using the first graphene compound 101, whereby generation of a by-product (a precipitate or the like) can be impaired, and generation of a micro short circuit can be inhibited.

The first graphene compound 101 also surrounds the plurality of solid electrolyte particles in addition to the plurality of negative electrode active material particles 103.

In the example shown in FIG. 1, a layer formed using the plurality of solid electrolyte particles 105 is provided between the positive electrode current collector 111 and the negative electrode current collector 110, and the solid electrolyte particles 105 and the solid electrolyte particles surrounded by the first graphene compound 101 contain the same component.

A structure including at least the positive electrode current collector 111 and the positive electrode active material particles 104 functions as a positive electrode, and this positive electrode is surrounded by a second graphene compound 102.

In the example shown in FIG. 1, the solid electrolyte particles 105 and the solid electrolyte particles surrounded by the second graphene compound 102 contain the same component. The distance between the first graphene compound 101 and the second graphene compound 102 is greater than or equal to 0.1 μm and less than or equal to 1 mm, preferably greater than or equal to 1 μm and less than or equal to 100 μm, although depending on a material of the solid electrolyte particle 105.

Figure 2:
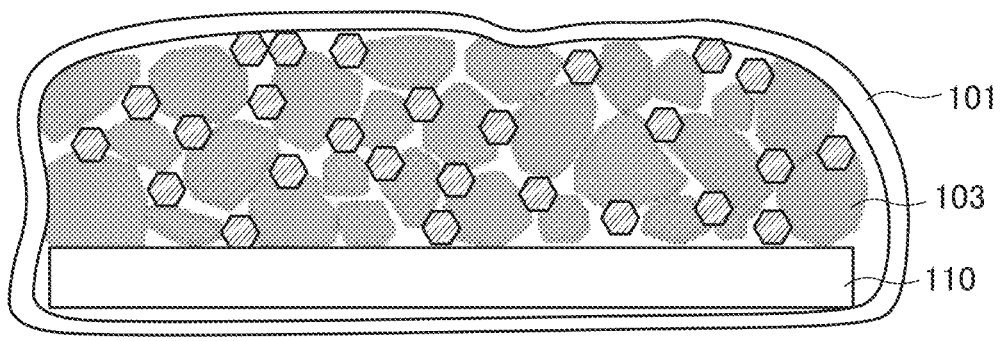
FIG. 2 is an example of a negative electrode showing one embodiment of the present invention.

FIG. 2 shows a schematic cross-sectional view after the solid electrolyte particles, the negative electrode active material particles 103, and the negative electrode current collector 110 are surround by the first graphene compound 101. After obtaining the state of FIG. 2, baking or a press step may be performed.

After the negative electrode active material particles 103 and the solid electrolyte particles are placed over the negative electrode current collector 110, reduced graphene oxide (RGO) is attached to surround the negative electrode current collector 110, the solid electrolyte particles, and the negative electrode active material particles 103.

A compound that can be obtained by reducing graphene oxide is referred to as RGO (Reduced Graphene Oxide) in some cases. In RGO, in some cases, all oxygen atoms contained in the graphene oxide are not extracted and part of them remains in a state of oxygen or an atomic group containing oxygen that is bonded to carbon. In some cases, RGO includes a functional group, e.g., an epoxy group, a carbonyl group such as a carboxyl group, or a hydroxyl group. A graphene compound in this specification and the like may include a precursor of graphene. The precursor of graphene refers to a substance used to form graphene. The precursor of graphene may contain the above-described graphene oxide, graphite oxide, or the like. Graphene containing an alkali metal or an element other than carbon, such as oxygen, is referred to as a graphene analog in some cases. In this specification and the like, graphene compounds include graphene analogs. A graphene compound contains a graphene quantum dot.

Then, after the solid electrolyte particles, the positive electrode active material particles 104, and the positive electrode current collector 111 are surrounded by the second graphene compound 102, stacking is performed with the plurality of solid electrolyte particles 105 between the first graphene compound 101 and the second graphene compound 102, whereby the solid-state battery is manufactured. Accordingly, the solid electrolyte particles are added at different timings in manufacture. Even solid electrolyte particles formed using the same material are partly changed in quality depending on a negative electrode active material, a positive electrode active material, or a manufacturing process to be used. In FIG. 1, the solid electrolyte particles are the same.

In practice, a space between the positive electrode current collector 111 and the negative electrode current collector 110 may be filled with a plurality of kinds of particles so that the space is reduced as much as possible by pressing.

At this stage, a stack shown in FIG. 1 can be obtained. For bonding, the stack is subjected to heat treatment and a press step to improve the denseness. Note that heating may be performed at the same time as the press step.

The obtained stack is held in an exterior body such as a laminate film or a metal can. In this manner, an all-solid-state battery can be manufactured.

Embodiment 2

In this embodiment, an example which is partly different from that in Embodiment 1 is described below with reference to FIG. 3.

Figure 3:
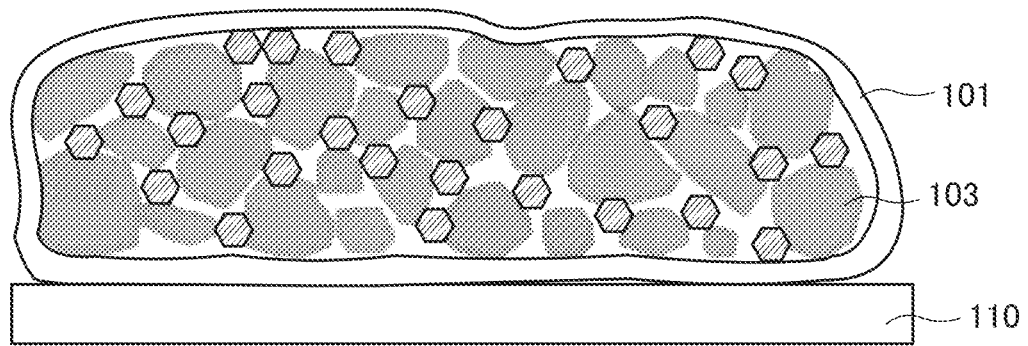
FIG. 3 is an example of a negative electrode showing one embodiment of the present invention.

FIG. 3 shows a structure example in which the current collector is not surrounded by the graphene compound. In the example in FIG. 3, the solid electrolyte particles and the negative electrode active material particles 103 are surrounded by the first graphene compound 101.

By stacking in combination with the positive electrode described in Embodiment 1, an all-solid-state battery can be manufactured.

Alternatively, an all-solid-state battery may be manufactured in such a manner that after the positive electrode is formed without surrounding the positive electrode current collector by the second graphene compound 102, and the positive electrode and the negative electrode in FIG. 2 are stacked.

This embodiment can be freely combined with Embodiment 1.

Embodiment 3

In this embodiment, an example which is partly different from that in Embodiment 1 is described below with reference to FIG. 4.

Figure 4:
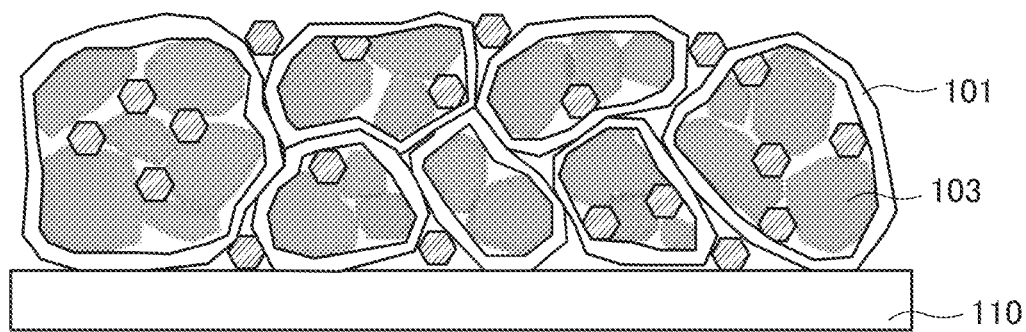
FIG. 4 is an example of a negative electrode showing one embodiment of the present invention.

FIG. 4 shows a plurality of groups surrounded by the first graphene, specifically, a structure in which the solid electrolyte particles and the negative electrode active material particles 103 are surrounded by the first graphene compounds 101. FIG. 4 shows seven groups. In addition, the solid electrolyte particles are placed in spaces therebetween.

The negative electrode shown in FIG. 4 and the positive electrode described in Embodiment 1 are stacked in combination, whereby an all-solid-state battery can be manufactured.

In a manner similar to that for the negative electrode shown in FIG. 4, an all-solid-state battery may be manufactured in such a manner that a plurality of groups are formed by the second graphene compounds 102 to form the positive electrode and then the positive electrode is stacked over the negative electrode in FIG. 4.

An all-solid-state battery may be manufactured in such a manner that the positive electrode is formed without surrounding the positive electrode current collector by the second graphene compound 102 and then stacked over the negative electrode in FIG. 4.

This embodiment can be freely combined with Embodiment 1 or Embodiment 2.

For example, an all-solid-state battery may be manufactured by combination of the positive electrode surrounded by the graphene compound as shown in FIG. 3 and the negative electrode described in this embodiment with reference to FIG. 4.

Embodiment 4

In this embodiment, an example of a method for manufacturing a positive electrode is described.

An example of a method for manufacturing a positive electrode active material is described with reference to FIG. 11.

Figure 11:
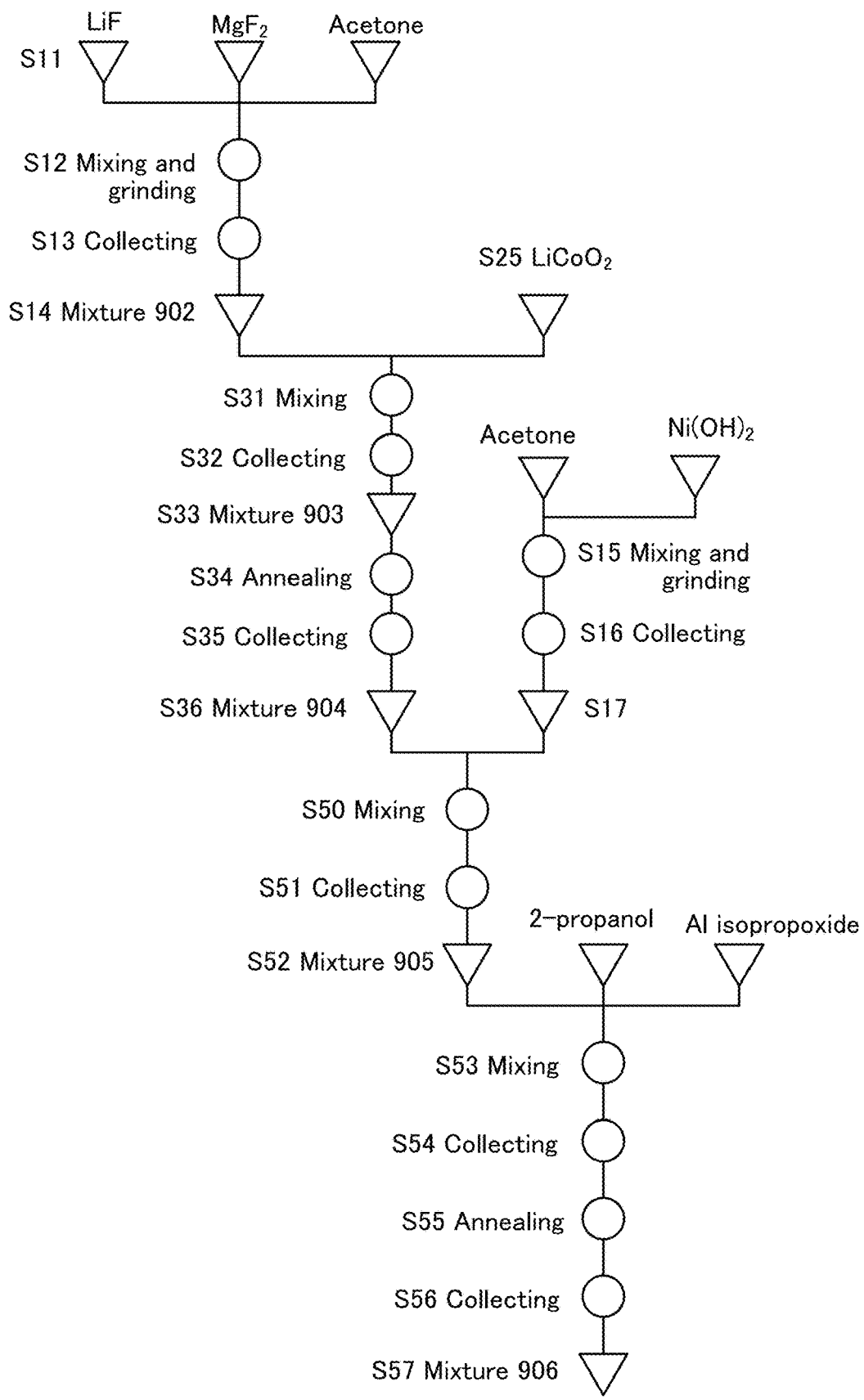
FIG. 11 is a diagram for explaining an example of a method for manufacturing a positive electrode active material.

As shown in Step S11 in FIG. 11, lithium fluoride that is a fluorine source and magnesium fluoride that is a magnesium source are first prepared as materials of a mixture 902. Among them, lithium fluoride, which has a relatively low melting point of 848° C., is preferable because it is easily melted in an annealing process described later. Lithium fluoride can be used as both the lithium source and the fluorine source. In addition, magnesium fluoride can be used as both the fluorine source and the magnesium source.

In this embodiment, lithium fluoride LiF is prepared as the fluorine source and the lithium source, and magnesium fluoride $MgF_2$ is prepared as the fluorine source and the magnesium source (Step S11 in FIG. 11). The molar ratio of lithium fluoride LiF to magnesium fluoride $MgF_2$ is preferably LiF:$MgF_2$=x:1 (0≤x≤1.9), further preferably LiF:$MgF_2$=x:1 (0.1≤x≤0.5), still further preferably LiF:$MgF_2$=x:1 (x=the vicinity of 0.33).

In addition, in the case where the following mixing and grinding steps are performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used (see Step S11 in FIG. 11).

Next, the materials of the mixture 902 are mixed and ground (Step S12 in FIG. 11). Although the mixing can be performed by a dry process or a wet process, the wet process is preferable because the materials can be ground to the smaller size. For example, a ball mill, a bead mill, or the like can be used for the mixing. When the ball mill is used, a zirconia ball is preferably used as media, for example. The mixing step and the grinding step are preferably performed sufficiently to pulverize the mixture 902.

The materials mixed and ground in the above are collected (Step S13 in FIG. 11), whereby the mixture 902 is obtained (Step S14 in FIG. 11).

For example, the mixture 902 preferably has a D50 of greater than or equal to 600 nm and less than or equal to 20 μm, further preferably greater than or equal to 1 μm and less than or equal to 10 μm. When mixed with a composite oxide containing lithium, a transition metal, and oxygen in the later step, the mixture 902 pulverized to such a small size is easily attached to surfaces of composite oxide particles uniformly. The mixture 902 is preferably attached to the surfaces of the composite oxide particles uniformly because both halogen and magnesium are easily distributed to the surface portion of the composite oxide particles after heating. When there is a region containing neither halogen nor magnesium in the surface portion, the positive electrode active material might be less likely to have the above-described pseudo-spinel crystal structure in the charged state.

Next, a lithium source is prepared as shown in Step S25. A composite oxide synthesized in advance which contains lithium, a transition metal, and oxygen is used as Step S25.

For example, as lithium cobalt oxide synthesized in advance, a lithium cobalt oxide particle (product name: CELLSEED C-10N) manufactured by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method (GD-MS), the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

The composite oxide including lithium, the transition metal, and oxygen in Step S25 preferably has a layered rock-salt crystal structure with few defects and distortions. Therefore, the composite oxide is preferably a composite oxide with few impurities. In the case where the composite oxide including lithium, the transition metal, and oxygen includes a lot of impurities, the crystal structure is highly likely to have a lot of defects or distortions.

Next, the mixture 902 and the composite oxide including lithium, the transition metal, and oxygen are mixed (Step S31 in FIG. 11). The atomic ratio of the transition metal TM in the composite oxide containing lithium, the transition metal, and oxygen to magnesium MgMix1 contained in the mixture 902 is preferably TM:MgMix1=1:y (0.005≤y≤0.05), further preferably TM:Mg$_{Mix1}$=1:y (0.007≤y≤0.04), still further preferably approximately TM:Mg$_{Mix1}$=1:0.02.

The condition of the mixing in Step S31 is preferably milder than that of the mixing in Step S12 not to damage the particles of the composite oxide. For example, a condition with a lower rotation frequency or shorter time than the mixing in Step S12 is preferable. In addition, it can be said that the dry process has a milder condition than the wet process. For example, a ball mill, a bead mill, or the like can be used for the mixing. When the ball mill is used, a zirconia ball is preferably used as media, for example.

The materials mixed in the above manner are collected (Step S32 in FIG. 11), whereby a mixture 903 is obtained (Step S33 in FIG. 11).

Next, the mixture 903 is heated. This step is referred to as annealing or second heating in some cases to distinguish this step from the heating step performed before.

The annealing is preferably performed at an appropriate temperature for an appropriate time. The appropriate temperature and time depend on the conditions such as the particle size and the composition of the composite oxide including lithium, the transition metal, and oxygen in Step S25. In the case where the particle size is small, the annealing is preferably performed at a lower temperature or for a shorter time than the case where the particle size is large, in some cases.

When the average particle diameter (D50) of the particles in Step S25 is approximately 12 μm, for example, an annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

On the other hand, when the average particle diameter (D50) of the particles in Step S25 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

It is considered that when the mixture 903 is annealed, a material having a low melting point (e.g., lithium fluoride, which has a melting point of 848° C.) in the mixture is melted first and distributed to the surface portion of the composite oxide particle. Next, the existence of the melted material decreases the melting points of other materials, presumably resulting in melting of the other materials. For example, magnesium fluoride (melting point: 1263° C.) is presumably melted and distributed to the surface portion of the composite oxide particle.

The elements included in the mixture 903 are diffused faster in the surface portion and the vicinity of the grain boundary than inside the composite oxide particles. Therefore, the concentrations of magnesium and halogen in the surface portion and the vicinity of the grain boundary are higher than those of magnesium and halogen inside the composite oxide particles. As described later, the higher the magnesium concentration in the surface portion and the vicinity of the grain boundary is, the more effectively the change in the crystal structure can be inhibited.

The materials annealed in the above manner are collected (Step S35 in FIG. 11), whereby a mixture 904 is obtained (Step S36 in FIG. 11).

Next, as shown in Step S50, the mixture 904 and pulverized nickel hydroxide are mixed. Then, the mixed materials are collected (Step S51). For the pulverized nickel hydroxide, Step S15 for mixing nickel hydroxide and acetone and Step S16 for collecting the mixture are performed in advance. Through Step S16, the pulverized nickel hydroxide is obtained (Step S17).

The materials mixed in Step S50 are collected in Step S51, whereby a mixture 905 is obtained (Step S52 in FIG. 11).

Next, through Step S53 to Step S55, a metal Z is added in the positive electrode active material. For the addition of the metal Z, a liquid phase method such as a sol-gel method, a solid phase method, a sputtering method, an evaporation method, a CVD (chemical vapor deposition) method, a PLD (pulsed laser deposition) method, and the like can be used.

As shown in FIG. 11, a metal source is first prepared in Step S52. In the case of employing a sol-gel method, a solvent used for the sol-gel method is also prepared. As the metal source, metal alkoxide, metal hydroxide, metal oxide, or the like can be used. When the metal Z is aluminum, for example, the aluminum concentration in the metal source ranges from 0.001 to 0.02 times that of cobalt with the number of cobalt atoms in the lithium cobalt oxide regarded as 1. When the metal Z is nickel, for example, the nickel concentration in the metal source ranges from 0.001 to 0.02 times that of cobalt with the number of cobalt atoms in the lithium cobalt oxide regarded as 1. When the metal Z is aluminum and nickel, for example, the aluminum concentration in the metal source ranges from 0.001 to 0.02 times that of cobalt and the nickel concentration in the metal source ranges from 0.001 to 0.02 times that of cobalt with the number of cobalt atoms in the lithium cobalt oxide regarded as 1.

Here, an example of employing a sol-gel method using aluminum isopropoxide as the metal source and isopropanol as the solvent is shown.

Next, the aluminum alkoxide is dissolved in alcohol, and then the lithium cobalt oxide particles are mixed (Step S53 in FIG. 11).

The necessary amount of metal alkoxide depends on the particle size of lithium cobalt oxide. For example, when aluminum isopropoxide is used and the particle diameter (D50) of the lithium cobalt oxide is approximately 20 μm, the aluminum isopropoxide is preferably added so that the aluminum concentration in the aluminum isopropoxide ranges from 0.001 to 0.02 times that of cobalt with the number of cobalt atoms in the lithium cobalt oxide regarded as 1.

Next, a mixed solution of the alcohol solution of metal alkoxide and the lithium cobalt oxide particles is stirred under an atmosphere containing water vapor. The stirring can be performed with a magnetic stirrer, for example. The stirring time is not limited as long as water and metal alkoxide in the atmosphere cause hydrolysis and polycondensation reaction. For example, the stirring can be performed at 25° C. and a humidity of 90% RH (Relative Humidity) for 4 hours. Alternatively, the stirring may be performed under an atmosphere where the humidity and temperature are not adjusted, for example, an air atmosphere in a fume hood. In such a case, the stirring time is preferably set longer and can be 12 hours or longer at room temperature, for example.

Reaction between water vapor and metal alkoxide in the atmosphere enables a sol-gel reaction to proceed more slowly as compared with the case where liquid water is added. Alternatively, reaction between metal alkoxide and water at room temperature enables a sol-gel reaction to proceed more slowly as compared with the case where heating is performed at a temperature higher than the boiling point of alcohol serving as a solvent, for example. A sol-gel reaction that proceeds slowly enables formation of a high-quality coating layer with a uniform thickness.

After the above process, the precipitate is collected from the mixed solution (Step S54 in FIG. 11). As the collection method, filtration, centrifugation, evaporation to dryness, and the like can be used. The precipitate can be washed with alcohol that is the same as the solvent in which metal alkoxide is dissolved. Note that in the case of employing evaporation to dryness, the solvent and the precipitate are not necessarily separated in this step; for example, the precipitate is collected in the subsequent drying step (Step S54).

Next, the collected residue is dried, so that a mixture is obtained (Step S54 in FIG. 11). In the drying step, vacuum or ventilation drying can be performed at 80° C. for 1 hour to 4 hours, for example.

Then, the obtained mixture is heated (Step S55 in FIG. 11).

As for the heating time, the time for keeping the heating temperature within a predetermined range is preferably longer than or equal to 1 hour and shorter than or equal to 80 hours.

The heating temperature is lower than 1000° C., preferably higher than or equal to 700° C. and lower than or equal to 950° C., further preferably approximately 850° C.

The heating is preferably performed in an oxygen-containing atmosphere.

In this embodiment, the heating temperature is 850° C. and kept for 2 hours, the temperature rising rate is 200° C./h, and the flow rate of oxygen is 10 L/min.

The heating temperature in Step S55 is preferably lower than the heating temperature in Step S34.

<Step S56 and Step S57>

Next, cooled particles are collected (Step S56 in FIG. 11). Moreover, the particles are preferably made to pass through a sieve. Through the above steps, a mixture 906 that can be used as a positive electrode active material can be manufactured (Step S57 in FIG. 11).

Each of the mixtures 902, 903, 904, 905, and 906 obtained through the above manufacturing process can be used as a positive electrode active material.

The mixture 902 is a positive electrode active material containing a lithium component, a magnesium component, and a fluorine component, and the mixtures 903 and 904 are each a positive electrode active material containing a lithium component, a cobalt component, a magnesium component, and a fluorine component.

The mixture 905 is a positive electrode active material containing a lithium component, a cobalt component, a magnesium component, a nickel component, and a fluorine component, and the mixture 906 is a positive electrode active material containing a lithium component, a cobalt component, a magnesium component, a nickel component, an aluminum component, and a fluorine component.

A slurry in which graphene oxide is dispersed in a solvent is formed, a plurality of positive electrode active material particles formed using any one of the mixtures 902, 903, 904, 905, and 906 are placed over the positive electrode current collector, and the slurry was applied to cover the plurality of positive electrode active material particles and dried. After that, the graphene can be attached to a surface of the positive electrode active material by reduction treatment.

This embodiment can be freely combined with any of the other embodiments.

For example, a solid-state battery can be manufactured in combination with Embodiment 1.

Embodiment 5

FIG. 1 described in Embodiment 1 is a diagram showing a concept of a cross-sectional structure of a solid-state battery, and the solid electrolyte particles 105 are included between the positive electrode current collector 111 and the negative electrode current collector 110. As a surrounding method by the first graphene compound 101, any one of methods in FIG. 2, FIG. 3, and FIG. 4 can be selected.

It is preferable to use a package having excellent airtightness as a sealed container for an all-solid-state battery, and a ceramic package or a resin package is used. Sealing is preferably performed in a closed atmosphere, for example, in a glove box, in which air is blocked.

Figure 5A:
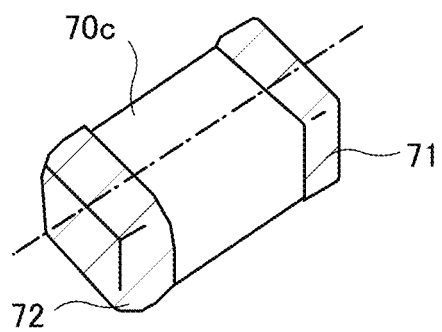
FIG. 5A is a perspective view of an all-solid-state battery.

FIG. 5A shows a perspective view of an all-solid-state secondary battery including external electrodes 71 and 72 and sealed with a package component. Such an all-solid-state secondary battery can be directly mounted on a circuit board or the like.

Figure 5B:
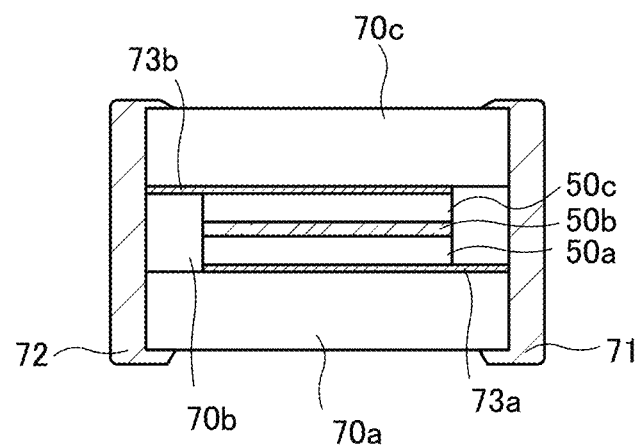
FIG. 5B is a cross-sectional view thereof.

FIG. 5B shows an example of a cross section cut along the dashed-dotted line in FIG. 5A. A stack is surrounded and sealed by a package component 70a in which an electrode layer 73a is provided on a flat plate, a frame-like package component 70b, and a package component 70c in which an electrode layer 73b is provided on a flat plate. For the package components 70a, 70b, and 70c, an insulating material such as a resin material or ceramic can be used.

The external electrode 71 is electrically connected to a positive electrode layer 50a through the electrode layer 73a and functions as a positive electrode. The external electrode 72 is electrically connected to a negative electrode layer 50c through the electrode layer 73b and functions as a negative electrode.

Although FIG. 5B shows an example in which a stack of the positive electrode layer 50a, a solid electrolyte layer 50b, and the negative electrode layer 50c is one set, a plurality of combinations may be further stacked.

FIG. 6A, FIG. 6B, FIG. 6C, and FIG. 6D show an example of a method for manufacturing a laminated secondary battery, which is different from the packaging method illustrated in FIG. 5A.

FIG. 6A illustrates external views of a positive electrode 503 and a negative electrode 506. The positive electrode 503 includes a positive electrode current collector 501, and a positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes a negative electrode current collector 504, and a negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 6A.

First, the negative electrode 506, a solid electrolyte layer 507, and the positive electrode 503 are stacked. FIG. 6B shows the negative electrodes 506, the solid electrolyte layers 507, and the positive electrodes 503 that are stacked. The secondary battery described here as an example includes 5 negative electrodes and 4 positive electrodes. Next, the tab regions of the positive electrodes 503 are bonded to each other, and the tab region of the positive electrode on the outermost surface and a positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and a negative electrode lead electrode 511 are bonded to each other.

Next, the negative electrode 506, the solid electrolyte layer 507, and the positive electrode 503 are placed over an exterior body 509. The solid electrolyte layer 507 may be a material layer containing a solid component with lithium-ion conductivity (e.g., ceramic or the like). As the solid electrolyte layer 507, for example, a sheet is formed using slurry made from ceramic powder or glass powder. Note that ceramic is defined as a metal or non-metal material of an inorganic compound such as an oxide, a carbide, a nitride, and a boride. Glass is defined as an amorphous material having a glass transition phenomenon, and microcrystalline glass may be called ceramic glass. Ceramic glass, which has crystallinity, can be identified by X-ray diffraction. For the solid electrolyte, an oxide solid electrolyte, a sulfide solid electrolyte, and the like can be used. Each of the positive electrode active material layer 502 and the negative electrode active material layer 505 contains a solid electrolyte and may include a conductive additive. The conductive additive can be any material with electron conductivity such as a carbon material and a metal material.

For an oxide solid electrolyte used as a positive electrode active material particle, $Li_3PO_4$, $Li_3BO_3$, $Li_4SiO_4$, $Li_4GeO_4$, $LiNbO_3$, $LiVO_2$, $LiTiO_3$, $LiZrO_3$, and the like can be used. Composite compounds thereof such as $Li_3BO_3$—$Li_4SiO_4$ can also be used. At least part of the surface of the solid electrolyte may be covered with a coat layer with a thickness of 1 nm or more to 20 nm or less, and as a material of the coat layer, an oxide with lithium-ion conductivity is used.

Examples of an oxide solid electrolyte used as a negative electrode active material particle include $Nb_2O_5$, $Li_4Ti_5O_{12}$, and SiO. In this specification and the like, SiO refers, for example, to silicon monoxide. Note that SiO may refer to a material with a higher silicon content than $SiO_2$, and may be expressed as $SiO_x$. Here, x preferably has an approximate value of 1. For example, x is preferably 0.2 or more and 1.5 or less, further preferably 0.3 or more and 1.2 or less.

Examples of a sulfide solid electrolyte used as a positive electrode active material particle include a material containing Li and S, such as $Li_7P_3S_{11}$, $Li_2S$—$SiS_2$, and $Li_2S$—$P_2S_5$.

Subsequently, the exterior body 509 is folded along a dashed line as illustrated in FIG. 6C. Then, the outer edges of the exterior body 509 are bonded to each other. For the exterior body 509, a laminated film in which metal foil such as aluminum foil or stainless steel foil and an organic resin film are stacked is used, for example. For the bonding, thermocompression bonding is performed, for example. In this manner, a laminated secondary battery 500 illustrated in FIG. 6D can be manufactured. Although an example in which one laminated film is used for the bonding is described, two laminated films may be stacked and sealed with the outer edges thereof attached to each other.

A battery module including a plurality of laminated secondary batteries 500 can be mounted on an electric vehicle or the like.

Figure 7A:
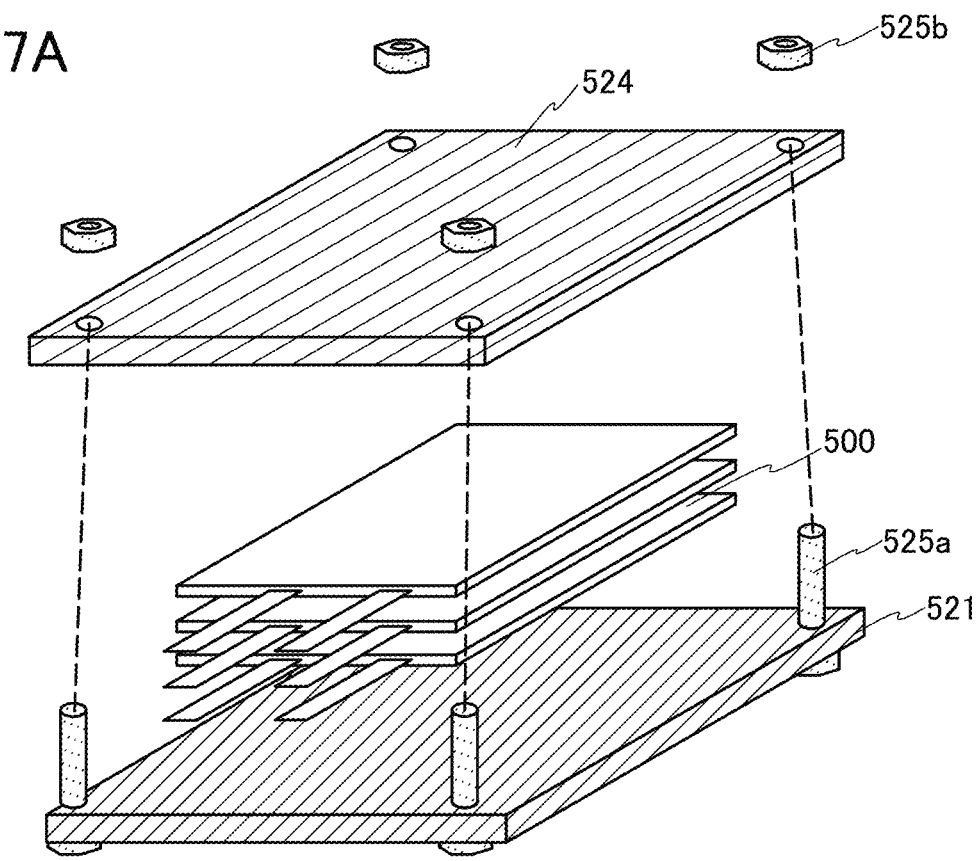
FIG. 7A and FIG. 7B are perspective views of an all-solid-state battery.

FIG. 7A is a perspective view showing three laminated secondary batteries 500 sandwiched and fixed between a first plate 521 and a second plate 524. The distance between the first plate 521 and the second plate 524 is fixed using a fixation tool 525a and a fixation tool 525b as shown in FIG. 7B, whereby stress can be applied to the three secondary batteries 500.

Figure 7B:
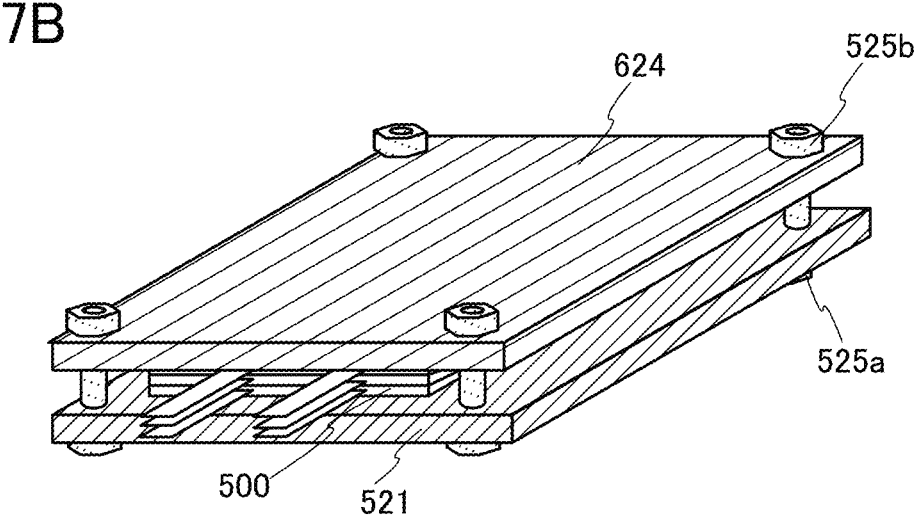

Although FIG. 7A and FIG. 7B show an example of using the three laminated secondary batteries 500, the number of secondary batteries 500 is not particularly limited and four or more secondary batteries 500 can be used. A set of ten or more secondary batteries 500 can be used as a power source for a compact vehicle, and a set of 100 or more secondary batteries 500 can be used as an in-vehicle large power source. In order to prevent overcharge, the laminated secondary battery 500 may be provided with a protection circuit or a temperature sensor for monitoring the temperature rise. The secondary battery is not limited to a laminated secondary battery and can be a coin-type secondary battery, a cylindrical secondary battery, a rectangular secondary battery, or the like.

In an all-solid-state battery, the contact state of the inside interfaces can be kept favorable by applying a predetermined pressure in the direction of stacking positive electrodes and negative electrodes. By applying a predetermined pressure in the direction of stacking positive electrodes and negative electrodes, expansion in the stacking direction due to charge and discharge of the all-solid-state battery can be suppressed, and the reliability of the all-solid-state battery can be improved.

Embodiment 6

In this embodiment, examples of vehicles each including the all-solid-state secondary battery of one embodiment of the present invention are described. Examples of vehicles are automobiles, motorcycles, bicycles, and the like.

The use of all-solid-state secondary batteries in vehicles enables production of next-generation clean energy vehicles such as hybrid electric vehicles (HEVs), electric vehicles (EVs), and plug-in hybrid electric vehicles (PHEVs).

Figure 8A:
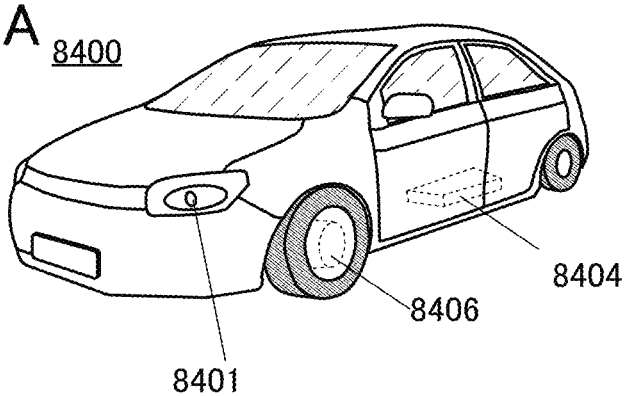
FIG. 8A, FIG. 8B, and FIG. 8C are examples of vehicles.

FIG. 8 shows examples of a vehicle using the all-solid-state secondary battery of one embodiment of the present invention. An automobile 8400 shown in FIG. 8A is an electric vehicle that runs on an electric motor as a power source. Alternatively, the automobile 8400 is a hybrid electric vehicle capable of driving appropriately using either an electric motor or an engine. The automobile 8400 includes a power storage system including an all-solid-state secondary battery 8404. The all-solid-state secondary battery 8404 is used not only for driving an electric motor 8406, but also for supplying electric power to a light-emitting device such as a headlight 8401 or a room light (not illustrated). An independent secondary battery which is separated from the one for driving is preferably provided to avoid a case where electric power supply is stopped and hazard lights does not work due to anomalies of the all-solid-state secondary battery 8404.

The all-solid-state secondary battery 8404 can also supply electric power to a display device included in the automobile 8400, such as a speedometer or a tachometer. Furthermore, the all-solid-state secondary battery 8404 can supply electric power to a navigation system or the like included in the automobile 8400.

Figure 8B:
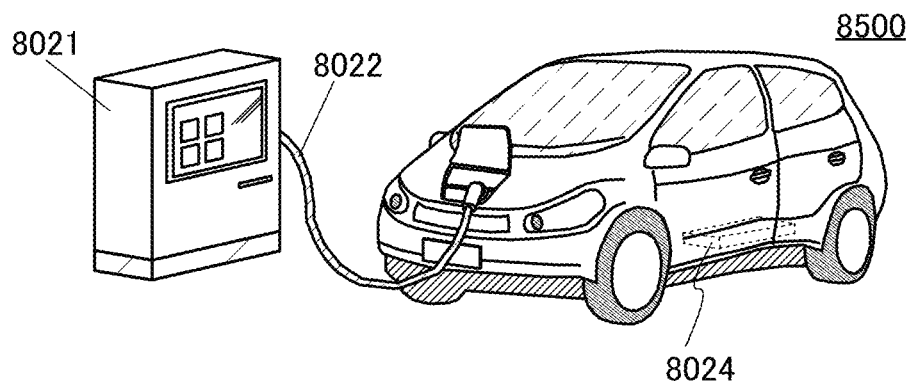

An automobile 8500 shown in FIG. 8B can be charged when an all-solid-state secondary battery included in the automobile 8500 is supplied with electric power from external charging equipment by a plug-in system, a contactless power feeding system, or the like. FIG. 8B shows a state where an all-solid-state secondary battery 8024 incorporated in the automobile 8500 is charged from a ground installation type charging device 8021 through a cable 8022. In charging, a given method such as CHAdeMO (registered trademark) or Combined Charging System may be employed as a charging method, the standard of a connector, or the like as appropriate. The charging device 8021 may be a charging station provided in a commerce facility or a power source in a house. With the use of a plug-in technique, the all-solid-state secondary battery 8024 included in the automobile 8500 can be charged by being supplied with electric power from the outside, for example. The charging can be performed by converting AC electric power into DC electric power through a converter, such as an ACDC converter. As the all-solid-state secondary battery 8024, the all-solid-state secondary battery described in Embodiment 2 is used.

Although not illustrated, the vehicle may include a power-receiving device so that it can be charged by being supplied with electric power from an aboveground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between vehicles.

Furthermore, a solar cell may be provided in the exterior of the vehicle to charge the all-solid-state secondary battery while the vehicle is stopped or while the vehicle is running. To supply electric power in such a contactless manner, an electromagnetic induction method or a magnetic resonance method can be used.

Figure 8C:
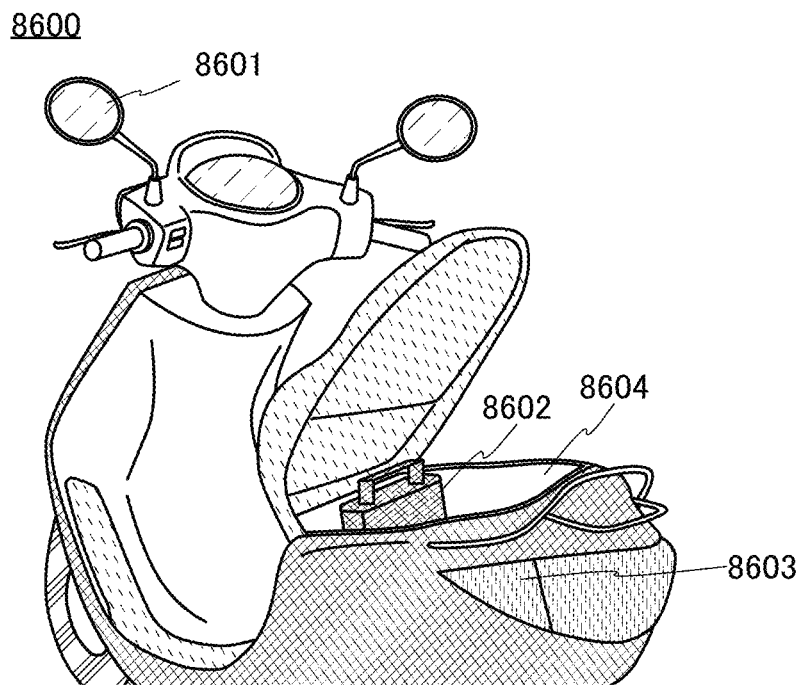

In addition, FIG. 8C is an example of a motorcycle using the all-solid-state secondary battery of one embodiment of the present invention. A scooter 8600 shown in FIG. 8C includes an all-solid-state secondary battery 8602, side mirrors 8601, and direction indicators 8603. The all-solid-state secondary battery 8602 can supply electricity to the direction indicators 8603.

In the scooter 8600 shown in FIG. 8C, the all-solid-state secondary battery 8602 can be stored in an under-seat storage 8604. The all-solid-state secondary battery 8602 can be stored in the under-seat storage 8604 even when the under-seat storage 8604 is small.

This embodiment can be combined with any of the other embodiments as appropriate.

Embodiment 7

In this embodiment, examples of electronic devices each including the solid-state battery described in the above embodiments are described with reference to FIG. 9 and FIG. 10.

First, examples of small electronic devices each including the solid-state battery of one embodiment of the present invention are described with reference to FIG. 9A to FIG. 9C.

Figure 9A:
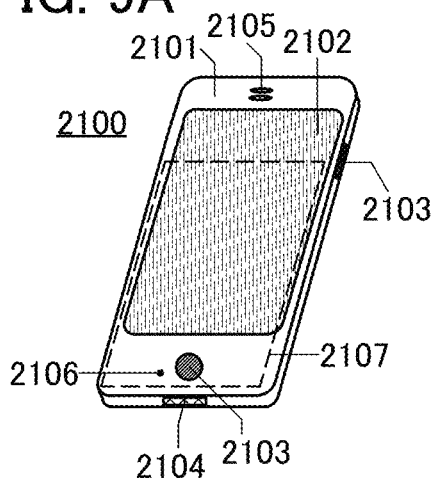
FIG. 9A, FIG. 9B, FIG. 9C, FIG. 9D, and FIG. 9E are perspective views showing examples of electronic devices.

FIG. 9A shows an example of a mobile phone. A mobile phone 2100 includes a housing 2101 in which a display portion 2102 is incorporated, an operation button 2103, an external connection port 2104, a speaker 2105, a microphone 2106, and the like. Note that the mobile phone 2100 includes a solid-state battery 2107. The solid-state battery 2107 is manufactured by combining any of Embodiments 1 to 5 described above and is a highly reliable solid-state battery in which occurrence of a micro-short circuit is suppressed.

The mobile phone 2100 is capable of executing a variety of applications such as mobile phone calls, e-mailing, viewing and editing texts, music reproduction, Internet communication, and computer games.

With the operation button 2103, a variety of functions such as time setting, power on/off operation, wireless communication on/off operation, execution and cancellation of a silent mode, and execution and cancellation of a power saving mode can be performed. For example, the functions of the operation button 2103 can also be set freely by an operating system incorporated in the mobile phone 2100.

In addition, the mobile phone 2100 can execute near field communication conformable to a communication standard. For example, mutual communication with a headset capable of wireless communication enables hands-free calling.

Moreover, the mobile phone 2100 includes the external connection port 2104, and data can be directly transmitted to and received from another information terminal via a connector. In addition, charging can be performed via the external connection port 2104. Note that the charging operation may be performed by wireless power feeding without using the external connection port 2104.

The mobile phone 2100 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

Figure 9B:
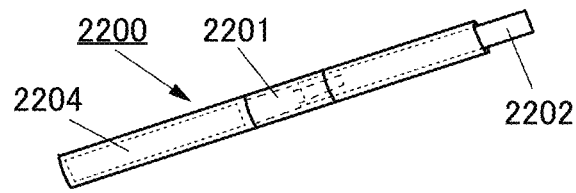

FIG. 9B is a perspective view of a device called a vaporizer (electronic cigarette). In FIG. 9B, an electronic cigarette 2200 includes a heating element 2201 and a solid-state battery 2204 that supplies electric power to the heating element 2201. A stick 2202 is inserted into this, and the stick 2202 is heated by the heating element 2201. To increase safety, a protection circuit for preventing overcharge and overdischarge of the solid-state battery may be electrically connected to the solid-state battery 2204. The solid-state battery 2204 illustrated in FIG. 9B includes an external terminal for connection to a charger. The solid-state battery 2204 is a tip portion when the electronic cigarette 2200 is held; thus, it is desirable that the solid-state battery 2204 have a short total length and be lightweight. The solid-state battery of one embodiment of the present invention has a high level of safety, and thus the small and lightweight electronic cigarette 2200 that can be used safely for a long time over a long period can be provided.

Figure 9C:
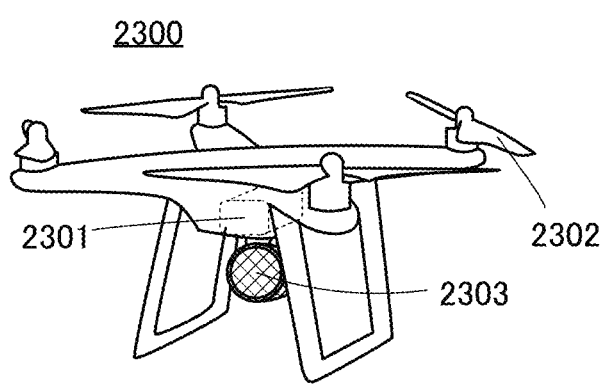

FIG. 9C illustrates an unmanned aircraft 2300 including a plurality of rotors 2302. The unmanned aircraft 2300 includes a solid-state battery 2301 of one embodiment of the present invention, a camera 2303, and an antenna (not illustrated). The unmanned aircraft 2300 can be remotely controlled through the antenna. The solid-state battery of one embodiment of the present invention is preferable as a solid-state battery mounted on the unmanned aircraft 2300 because it has a high level of safety and thus can be used safely for a long time over a long period.

Next, examples of vehicles each including the solid-state battery of one embodiment of the present invention are described with reference to FIG. 9D and FIG. 9E.

Figure 9D:
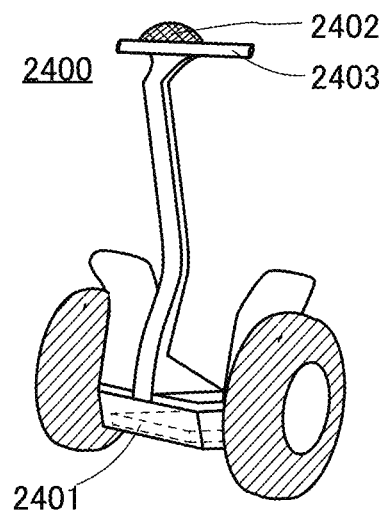

FIG. 9D shows an electric two-wheeled vehicle 2400 using the solid-state battery of one embodiment of the present invention. The electric two-wheeled vehicle 2400 includes a solid-state battery 2401 of one embodiment of the present invention, a display portion 2402, and a handle 2403. The solid-state battery 2401 can supply electricity to a motor serving as a power source. The display portion 2402 can display the remaining battery level of the solid-state battery 2401, the velocity and horizontal state of the electric two-wheeled vehicle 2400, and the like.

Figure 9E:
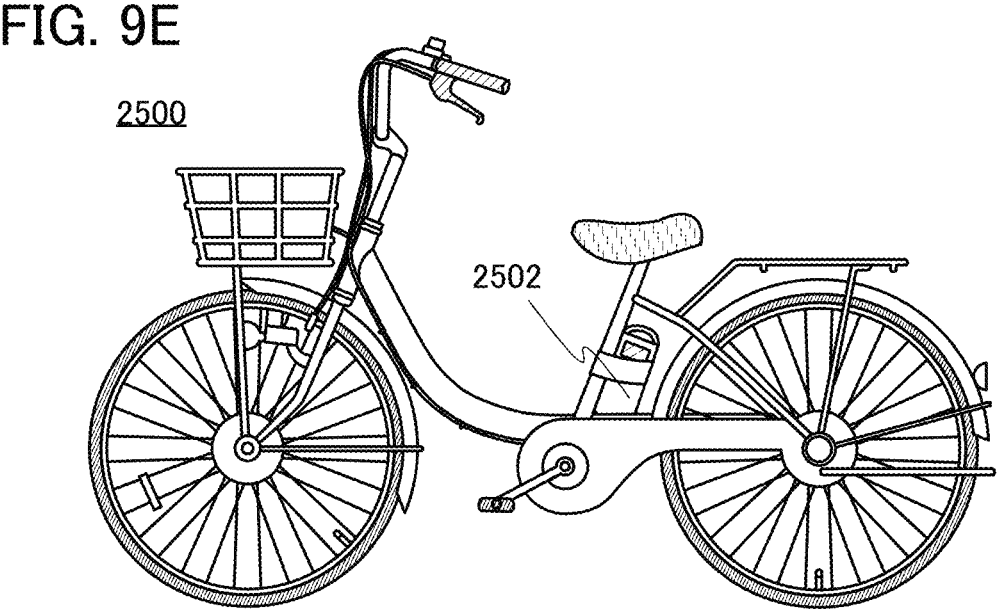

FIG. 9E shows an example of an electric bicycle using the solid-state battery of one embodiment of the present invention. An electric bicycle 2500 includes a battery pack 2502. The battery pack 2502 includes the solid-state battery of one embodiment of the present invention.

The battery pack 2502 can supply electricity to a motor that assists a rider. Furthermore, the battery pack 2502 can be taken off from the electric bicycle 2500 and carried. The battery pack 2502 and the electric bicycle 2500 may each include a display portion for displaying the remaining battery level and the like.

Figure 10:
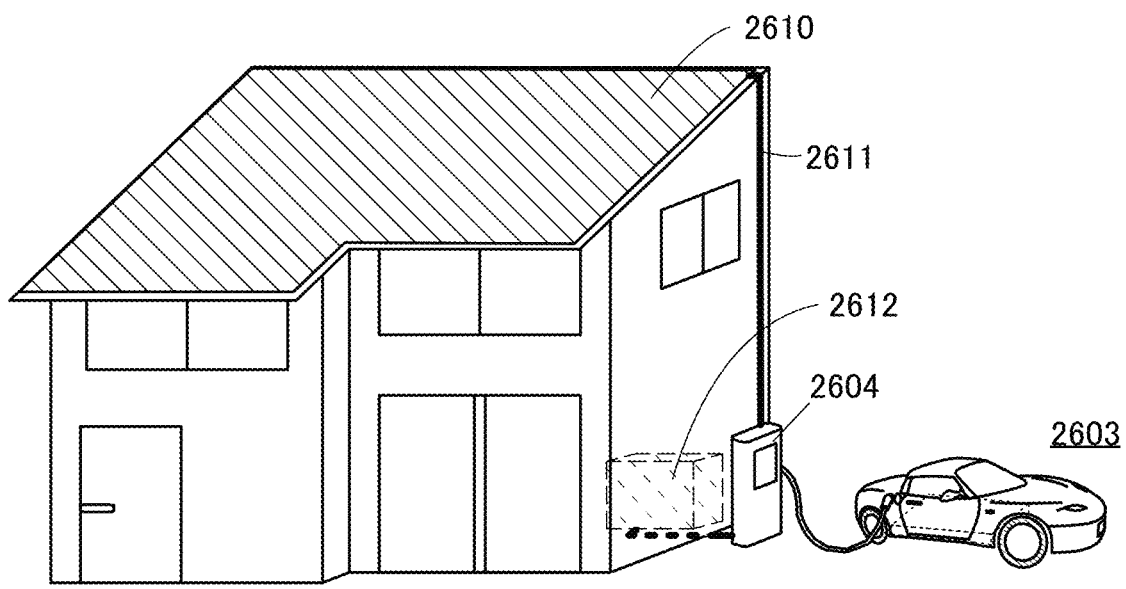
FIG. 10 is a perspective view showing an example of a power storage device.

A house shown in FIG. 10 includes a power storage system 2612 including the solid-state battery of one embodiment of the present invention and a solar panel 2610. The power storage system 2612 is electrically connected to the solar panel 2610 through a wiring 2611 or the like. The power storage system 2612 may be electrically connected to the ground-based charging device 2604. The power storage system 2612 can be charged with electric power generated by the solar panel 2610. A solid-state battery 2602 included in a vehicle 2603 can be charged with the electric power stored in the power storage system 2612 through the charging device 2604.

The electric power stored in the power storage system 2612 can also be supplied to other electronic devices in the house. Thus, electronic devices can be used with the use of the power storage system 2612 of one embodiment of the present invention as an uninterruptible power supply even when electric power cannot be supplied from a commercial power supply due to power failure or the like.

This embodiment can be implemented in appropriate combination with any of the other embodiments.

REFERENCE NUMERALS

50*a*: positive electrode layer, 50*b*: solid electrolyte layer, 50*c*: negative electrode layer, 70*a*: package component, 70*b*: package component, 70*c*: package component, 71: external electrode, 72: external electrode, 73*a*: electrode layer, 73*b*: electrode layer, 101: first graphene compound, 102: second graphene compound, 103: negative electrode active material particle, 104: positive electrode active material particle, 105: solid electrolyte particle, 110: negative electrode current collector, 111: positive electrode current collector, 500: secondary battery, 501: positive electrode current collector, 502: positive electrode active material layer, 503: positive electrode, 504: negative electrode current collector, 505: negative electrode active material layer, 506: negative electrode, 507: solid electrolyte layer, 509: exterior body, 510: positive electrode lead electrode, 511: negative electrode lead electrode, 521: plate, 524: plate, 525*a*: fixation tool, 525*b*: fixation tool, 902: mixture, 903: mixture, 904: mixture, 905: mixture, 906: mixture, 2100: mobile phone, 2101: housing, 2102: display portion, 2103: operation button, 2104: external connection port, 2105: speaker, 2106: microphone, 2107: solid-state battery, 2200: electronic cigarette, 2201: heating element, 2202: stick, 2204: solid-state battery, 2300: unmanned aircraft, 2301: solid-state battery, 2302: rotor, 2303: camera, 2400: electric two-wheeled vehicle, 2401: solid-state battery, 2402: display portion, 2403: handle, 2500: electric bicycle, 2502: battery pack, 2602: solid-state battery, 2603: vehicle, 2604: charging device, 2610: solar panel, 2611: wiring, 2612: power storage system, 8021: charging device, 8022: cable, 8024: all-solid-state secondary battery, 8400: automobile, 8401: headlight, 8404: all-solid-state secondary battery, 8406: electric motor, 8500: automobile, 8600: scooter, 8601: side mirror, 8602: all-solid-state secondary battery, 8603: direction indicator, 8604: under-seat storage

The invention claimed is:

1. An all-solid-state battery comprising:
 a plurality of positive electrode active material particles containing at least one carrier ion;
 a plurality of negative electrode active material particles;
 a plurality of solid electrolyte particles; and
 a plurality of graphene compounds,
 wherein one of the plurality of graphene compounds fix one of the plurality of negative electrode active material particles and a negative electrode current collector, and
 wherein the carrier ion passes through the one of the plurality of graphene compounds to be taken into the one of the plurality of negative electrode active material particles in charging.

2. The all-solid-state battery according to claim 1, wherein the one of the plurality of graphene compounds fixes the plurality of negative electrode active material particles.

3. The all-solid-state battery according to claim 1, wherein the one of the plurality of graphene compounds fixes one of the plurality of positive electrode active material particles.

4. An all-solid-state battery,
 wherein a plurality of positive electrode active material particles containing at least one carrier ion, a positive electrode current collector and a plurality of first solid electrolyte particles are at least partly or entirely surrounded by a first graphene compound,
 wherein a plurality of negative electrode active material particles, a negative electrode current collector and a plurality of second solid electrolyte particles are at least partly or entirely surrounded by a second graphene compound, and
 wherein a plurality of third solid electrolyte particles are included between the first graphene compound and the second graphene compound overlapping with the first graphene compound.

5. An all-solid-state battery,
 wherein a plurality of groups in each of which a plurality of positive electrode active material particles containing at least one carrier ion and a plurality of first solid electrolyte particles are surrounded by a first graphene compound are adjacent to each other,
 wherein a plurality of negative electrode active material particles and a plurality of second solid electrolyte particles are surrounded by a second graphene compound,
 wherein a positive electrode current collector is surrounded by the first graphene compound,
 wherein a negative electrode current collector is surrounded by the second graphene compound, and wherein a plurality of third solid electrolyte particles are included between the groups of the first graphene compound and the second graphene compound overlapping with the groups of the first graphene compound.

6. The all-solid-state battery according to claim 5,
wherein each of the first, second, and third solid electrolyte particles contains the same component.

7. The all-solid-state battery according to claim 5,
wherein the carrier ion is a lithium ion or a sodium ion.

8. The all-solid-state battery according to claim 5,
wherein each of the plurality of the positive electrode active material particles contains any one of cobalt, nickel, magnesium, manganese, and aluminum.

9. The all-solid-state battery according to claim 5,
wherein each of the plurality of negative electrode active material particles contains any one of silicon, titanium, and carbon.

10. The all-solid-state battery according to claim 1,
wherein the plurality of graphene compounds fix the plurality of negative electrode active material particles.

11. The all-solid-state battery according to claim 1,
wherein the one of the plurality of graphene compounds fixes the plurality of positive electrode active material particles.

12. The all-solid-state battery according to claim 1,
wherein the plurality of graphene compounds fix the plurality of positive electrode active material particles.

13. The all-solid-state battery according to claim 1,
wherein the carrier ion is a lithium ion or a sodium ion.

14. The all-solid-state battery according to claim 1,
wherein each of the plurality of the positive electrode active material particles contain any one of cobalt, nickel, magnesium, manganese, and aluminum.

15. The all-solid-state battery according to claim 1,
wherein each of the plurality of the negative electrode active material particles contains any one of silicon, titanium, and carbon.

16. The all-solid-state battery according to claim 4,
wherein each of the first, second, and third solid electrolyte particles contains the same component.

17. The all-solid-state battery according to claim 4,
wherein the carrier ion is a lithium ion or a sodium ion.

18. The all-solid-state battery according to claim 4,
wherein each of the plurality of the positive electrode active material particles contains any one of cobalt, nickel, magnesium, manganese, and aluminum.

19. The all-solid-state battery according to claim 4,
wherein each of the plurality of the negative electrode active material particles contains any one of silicon, titanium, and carbon.

* * * * *